United States Patent [19]

Hai

[11] 3,946,656
[45] Mar. 30, 1976

[54] MANUFACTURE OF FILLED PASTRY ROLLS

[75] Inventor: Harry Wong Hon Hai, Kowloon, Hong Kong

[73] Assignee: Winner Food Products Limited, Kowloon, Hong Kong

[22] Filed: July 1, 1974

[21] Appl. No.: 484,395

[30] Foreign Application Priority Data
Aug. 9, 1973 United Kingdom............... 37758/73

[52] U.S. Cl. ............................................. 99/450.6
[51] Int. Cl.² .......................................... A21C 9/06
[58] Field of Search ........ 99/450.6, 450.1; 426/297, 426/502; 83/277

[56] References Cited
UNITED STATES PATENTS

| | | | |
|---|---|---|---|
| 2,214,917 | 9/1940 | Angell | 426/297 |
| 3,633,517 | 1/1972 | Kao | 99/450.6 |
| 3,669,007 | 6/1972 | Pulici | 99/450.6 |
| 3,774,486 | 11/1973 | Johnsson | 83/277 |

Primary Examiner—Daniel Blum
Assistant Examiner—Alan Cantor
Attorney, Agent, or Firm—Steward & Steward

[57] ABSTRACT

A filled pastry roll is made from a continuously supplied strip of pastry by apparatus in which a conveyor conveys the pastry through a sequence of treatment stations. A receiving station includes a cutter which cuts a square of pastry from the leading end of the strip. A feeding station includes means for feeding a filling onto the square. A first folding station includes a movable deflector which folds one corner of the square over the filling. A second folding station includes a pair of opposed deflectors which fold the two adjacent corners inwards in succession, so that they overlap. A rolling station includes two parallel platforms between which the folded pastry is rolled by relative reciprocation of the platforms.

8 Claims, 8 Drawing Figures

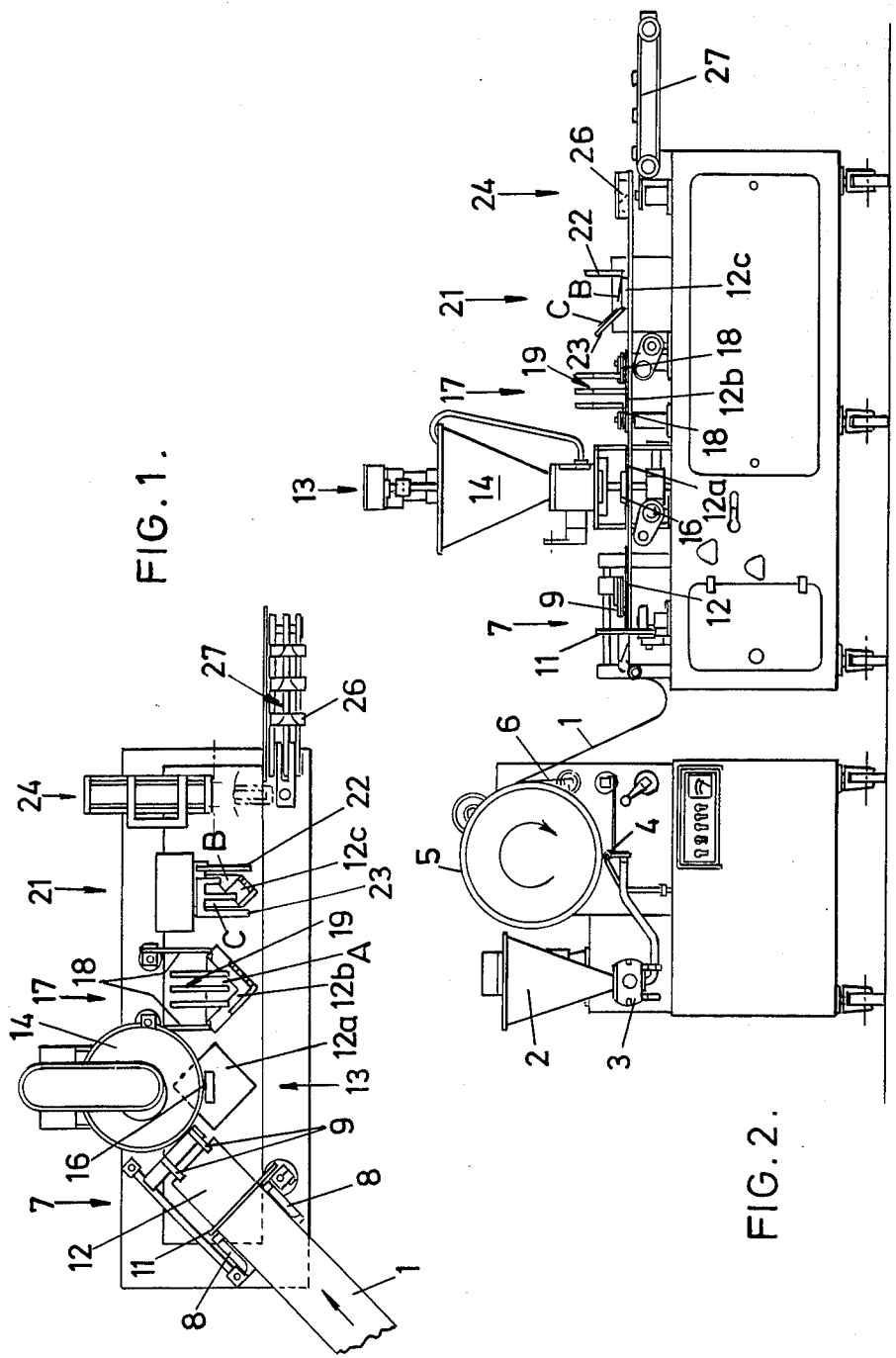

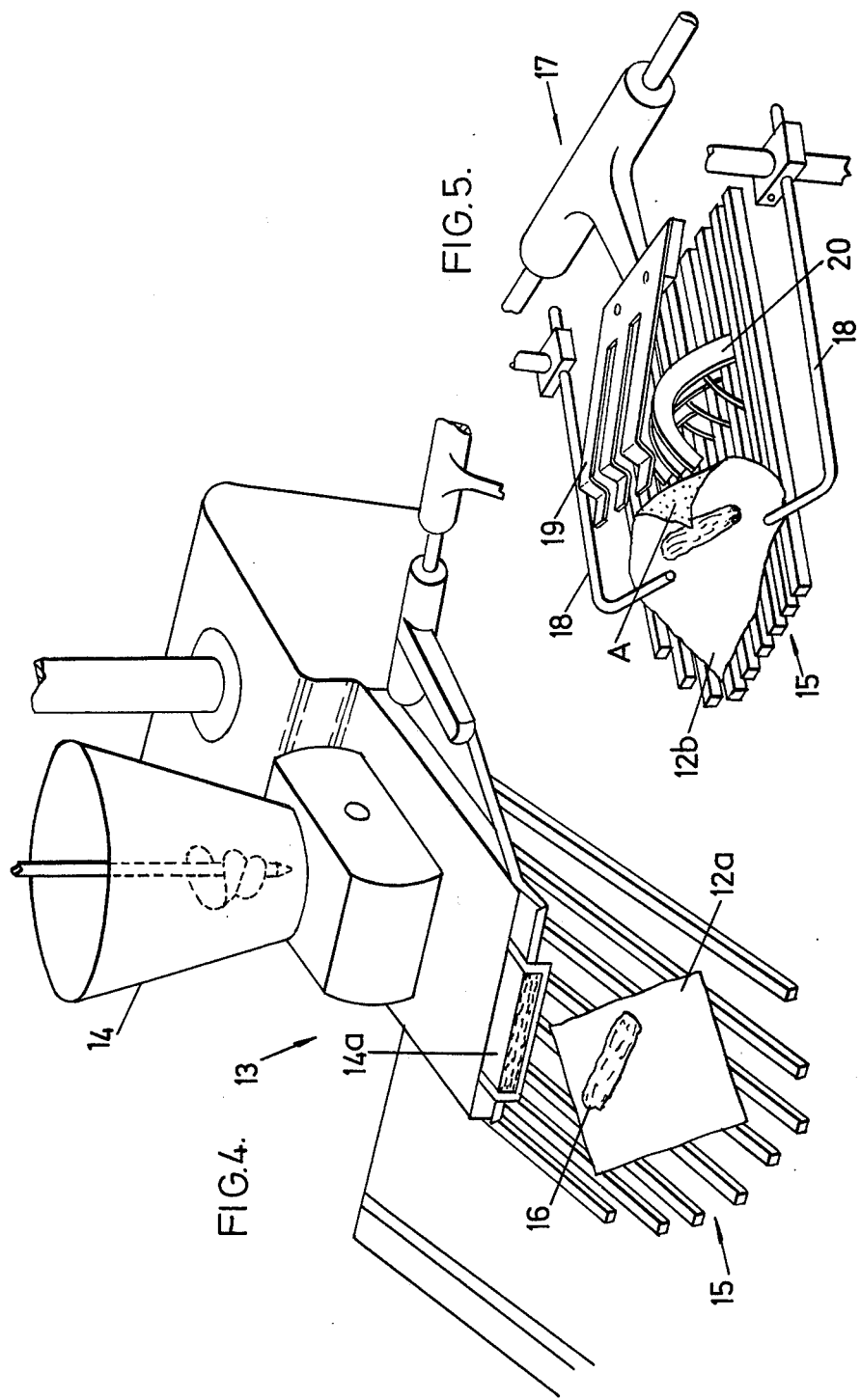

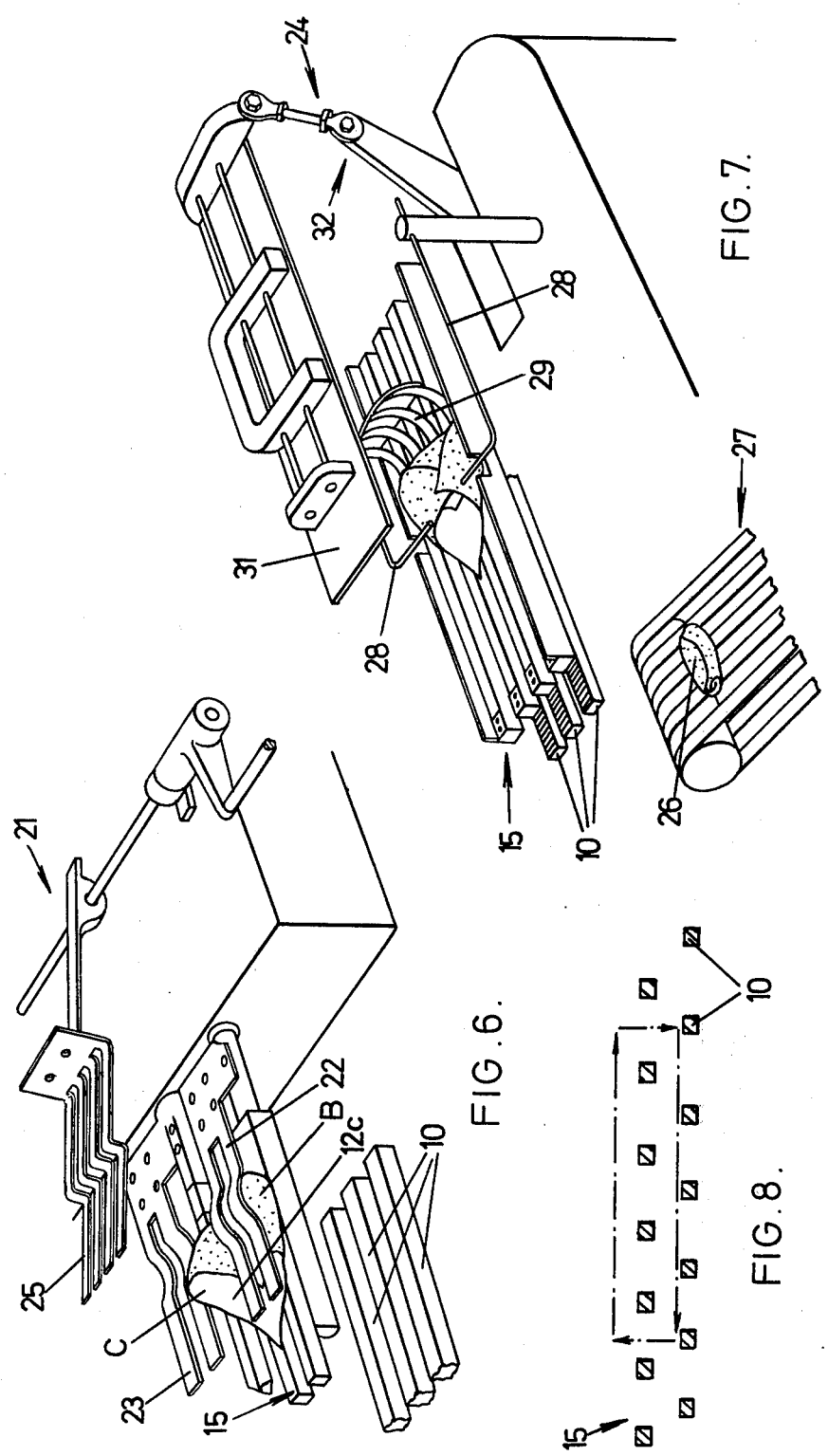

MANUFACTURE OF FILLED PASTRY ROLLS

BACKGROUND OF THE INVENTION

This invention relates to the making of filled pastry rolls, especially spring rolls. A spring roll usually consists of a filling of bean sprouts, chopped chicken or pork, and chopped mushroom, wrapped in pastry.

U.K. Pat. No. 1,278,526 is concerned with the continuous preparation of pastry. The pastry is produced in a strip. The present invention is directed towards converting such a continuously supplied strip of pastry into filled rolls.

SUMMARY OF THE INVENTION

The present invention provides apparatus for making a filled pastry roll from a continuously supplied strip of pastry, the apparatus comprising: a receiving station including a cutter adapted to cut a square of pastry from the leading end of the strip; a feeding station including means for feeding a filling onto the square; a first folding station including a movable deflector adapted to fold one corner of the square over the filling; a second folding station including a pair of opposed deflectors which are movable in succession to fold the two adjacent corners inwards so that they overlap; a rolling station including two parallel platforms adapted to receiving the folded pastry between them, and means for reciprocating the platform relative to one another so as to form the folded pastry into a roll; and means for conveying the pastry from each station to the next.

The strip of pastry can conveniently be supplied directly from the apparatus described in U.K. Pat. No. 1,278,526. The filling is preferably supplied from a hopper.

Preferably, the folding of the square is performed by movable deflectors each comprising a group of fingers. The pastry can be supported at each station by a platform of stationary fingers, the pastry being moved from station to station by conveying fingers arranged to move on a closed (preferably rectangular) path which passes between the stationary fingers and does not interfere with them.

DESCRIPTION OF THE PREFERRED EMBODIMENT

The invention will be described further, by way of example only, with reference to the accompanying drawings, in which:

FIG. 1 is a diagrammatic plan view of apparatus for making spring rolls;

FIG. 2 is a diagrammatic side elevation of the same apparatus, also showing the apparatus producing the strip of pastry;

FIG. 4 is a perspective view of another part of the apparatus, showing the feeding station;

FIG. 5 is a perspective view of a further part of the apparatus, showing the first folding station;

FIG. 6 is a perspective view of a further part of the apparatus, showing the second folding station;

FIG. 7 is a perspective view of a further part of the apparatus, showing the rolling station and discharge conveyor; and FIG. 8 is a diagrammatic cross-section through the platform fingers and conveying fingers, illustrating the rectangular motion of the conveying fingers.

Figure 3:
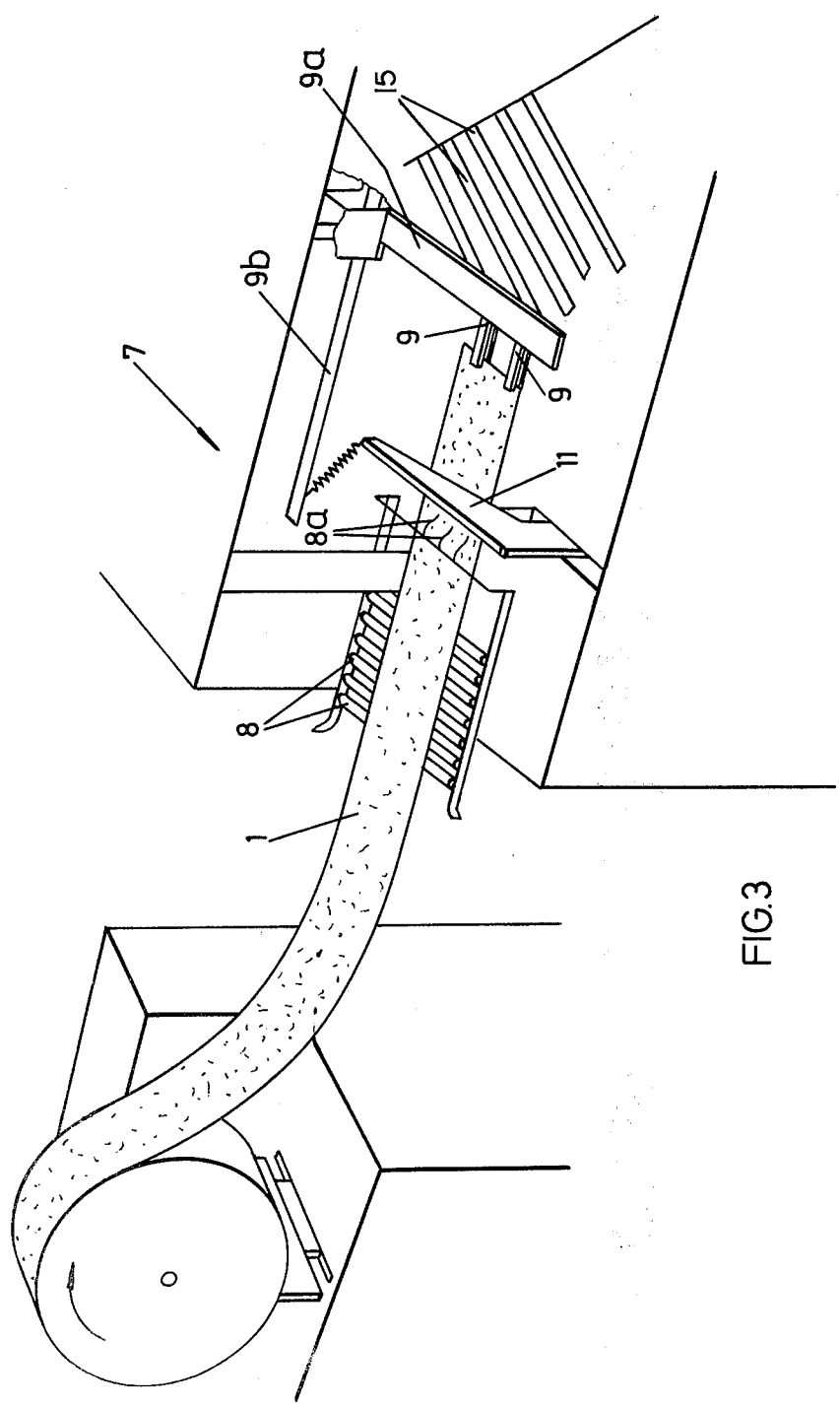
FIG. 3 is a perspective view of part of the apparatus, showing the cutting station.

A strip 1 of partially cooked pastry is supplied by apparatus similar to that described in U.K. Pat. No. 1,278,526. Flour paste from a hopper 2 is supplied at a constant rate by a gear pump 3 to an elongate nozzle 4 adjacent the bottom of a drum 5. The drum is heated internally by thermostatically controlled electrical heaters (not shown) and is rotated at an adjustable constant speed so that it takes up a layer of paste of constant thickness. The partly cooked pastry strip 1 is removed from the descending side of the drum 5 with the assistance of a scraper 6.

The strip 1 enters the spring roll making apparatus at an angle of about 45°. (In FIG. 2 the pastry making apparatus has been turned through 45° to show its parts more clearly.) The incoming strip 1 is received at a receiving station 7 (FIG. 3) by a bed of stainless steel rollers 8 and its leading edge is drawn forward by a gripper comprising a pair of clamps 9. The clamps 9 are carried by a holder 9a which moves back and forth along a track 9b. When the clamps reach the end of their travel, a cutter or knife 11 falls to cut a square 12 from the leading end of the strip 1. To prevent the remaining strip 1 from falling, it is held by fingers 8a.

The square 12 is released by the clamps 9 and is transferred to a feeding station 13 (FIG. 4) by a set of circulating conveying fingers 10 (FIG. 8). The square rests on a platform 15 defined by stationary fingers, which do not interfere with the conveying fingers. Here a filling hopper 14 having a gate 14a deposits an elongate portion 16 of spring roll filling on the square 12a.

The conveying fingers 10 again transfer the square 12a along the platform 15 to the next station, which is the first folding station 17 (FIG. 5). A pair of horizontally swivellable bent arms 18 swing inwards to define the line along which the first fold will be formed. Then one corner A of the square 12b is folded over the arms 18 by a group of deflector fingers 20 and a group of three pressing fingers 19, the corner covering the filling.

The part-folded square 12b is transferred along the platform 15 to a second folding station 21 (FIG. 6) by the conveying fingers 10. At the station 21, two groups of deflector fingers 22 and 23 successively fed over the respective corners B and C adjacent the already-folded corner A, so that they overlap. The folded square is then compressed by pressing fingers 25.

The folded square 12c is then transferred (as before) to a rolling station 24 (FIG. 7), where it is initially held by a pair of horizontally swivellable bent arms 28. Here it lies between two parallel platforms, the lower platform being constituted by the platform 15, to which are connected a number of flexible stainless-steel strips 29. The upper platform is constituted by a plate 31, and the strips 29 are bent back on themselves through 180° and connected to this plate. The plate 31 is reciprocated (longitudinally of the strips 29) relative to the platform 15 by a linkage 32 so that the folded square of pastry is transformed into a roughly cylindrical roll 26, much as if it were being rolled between the palms of a person's hands.

Upon discharge from the rolling station 24, the roll 26 is diverted through 90° onto a belt conveyor 27 from where the rolls are picked up for packing.

I claim:

1. Apparatus for making a filled pastry roll from a continuously supplied strip of pastry, the apparatus comprising: a receiving station including a cutter adapted to cut a square of pastry from the leading end of the strip; a feeding station including means for feeding a filling onto the square; a first folding station including a movable deflector adapted to fold one corner of the square over the filling; a second folding station including a pair of opposed deflectors which are movable in succession to fold the two corners adjacent said one corner inwards toward each other so that they overlap; a rolling station including two parallel horizontal platforms positioned one above the other and spaced apart in order to receive the folded pastry between them and means for reciprocating the platforms horizontally relative to one another, whereby the folded pastry is formed into a roll as if it were being rolled between the palms of a person's hands; and means for conveying the pastry from each station to the next.

2. Apparatus as claimed in claim 1, wherein the rolling station further includes at least one flexible strip interconnecting the platforms, the strip being bent back on itself and extending in the direction of relative reciprocation of the platforms.

3. Apparatus as claimed in claim 1, wherein the direction of relative reciprocation of the platforms of the rolling station is transverse to the conveying direction of the conveying means.

4. Apparatus as claimed in claim 1, wherein the receiving station further includes a reciprocable gripper adapted to draw the leading end of the pastry strip into the zone of action of the cutter.

5. Apparatus as claimed in claim 4, in which the direction of reciprocation of the gripper is at an angle of about 45° to the conveying direction of the conveying means.

6. Apparatus as claimed in claim 1, further comprising, at each station, a platform of stationary fingers, the conveying means comprising conveying fingers arranged to move on a closed path which passes between the stationary fingers.

7. Apparatus as claimed in claim 6, in which the closed path is substantially rectangular.

8. Apparatus as claimed in claim 6, in which each deflector comprises a group of fingers.

* * * * *